US012189330B2

(12) United States Patent
Terauchi et al.

(10) Patent No.: US 12,189,330 B2
(45) Date of Patent: Jan. 7, 2025

(54) IMAGE FORMING APPARATUS INCLUDING SECONDARY TRANSFER DEVICE POSITIONER FOR MAINTAINABILITY

(71) Applicants: Hiroki Terauchi, Kanagawa (JP); Takahiro Konishi, Tokyo (JP)

(72) Inventors: Hiroki Terauchi, Kanagawa (JP); Takahiro Konishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/332,195

(22) Filed: Jun. 9, 2023

(65) Prior Publication Data

US 2024/0027941 A1 Jan. 25, 2024

(30) Foreign Application Priority Data

Jul. 25, 2022 (JP) ................................ 2022-117913

(51) Int. Cl.

*G03G 21/00* (2006.01)
*G03G 21/16* (2006.01)
*G03G 15/16* (2006.01)

(52) U.S. Cl.

CPC ....... *G03G 21/168* (2013.01); *G03G 15/1615* (2013.01); *G03G 2221/1642* (2013.01)

(58) Field of Classification Search

CPC ............. G03G 15/1615; G03G 15/167; G03G 15/1605; G03G 21/168; G03G 2221/1642
USPC ................................................ 399/302, 308
See application file for complete search history.

(56) References Cited

U.S. PATENT DOCUMENTS

| | | | | |
|---|---|---|---|---|
| 9,037,042 | B2 * | 5/2015 | Kato | G03G 15/0131 399/317 |
| 2004/0228653 | A1 * | 11/2004 | Yoshino | G03G 21/1647 399/121 |
| 2014/0147160 | A1 | 5/2014 | Konishi | |
| 2015/0043928 | A1 | 2/2015 | Konishi et al. | |
| 2015/0050080 | A1 | 2/2015 | Morita et al. | |
| 2015/0346651 | A1 | 12/2015 | Nagata et al. | |
| 2017/0010566 | A1 | 1/2017 | Kato et al. | |
| 2017/0131671 | A1 | 5/2017 | Nishimura et al. | |
| 2017/0168429 | A1 | 6/2017 | Imai et al. | |
| 2018/0046115 | A1 * | 2/2018 | Fujita | G03G 15/1615 |
| 2019/0230229 | A1 | 7/2019 | Terauchi | |
| 2020/0064765 | A1 | 2/2020 | Suga et al. | |
| 2020/0133172 | A1 | 4/2020 | Konishi et al. | |
| 2021/0373464 | A1 * | 12/2021 | Yamana | G03G 15/1605 |
| 2023/0090307 | A1 | 3/2023 | Konishi | |

FOREIGN PATENT DOCUMENTS

JP 2020-140137 9/2020

* cited by examiner

*Primary Examiner* — Robert B Beatty
(74) *Attorney, Agent, or Firm* — IPUSA, PLLC

(57) ABSTRACT

An image forming apparatus includes an intermediate transfer unit, a secondary transfer unit, and a positioner. The intermediate transfer unit includes an intermediate transferor to bear an image. The secondary transfer unit includes a secondary transfer member to transfer the image borne by the intermediate transferor to a medium. The positioner positions the secondary transfer unit with respect to the intermediate transfer unit. The positioner includes a first member and a second member. The first member is disposed in the intermediate transfer unit. The second member is attachable to and detachable from the secondary transfer unit.

6 Claims, 8 Drawing Sheets

IMAGE FORMING APPARATUS INCLUDING SECONDARY TRANSFER DEVICE POSITIONER FOR MAINTAINABILITY

CROSS-REFERENCE TO RELATED APPLICATION

This patent application is based on and claims priority pursuant to 35 U.S.C. § 119(a) to Japanese Patent Application No. 2022-117913, filed on Jul. 25, 2022, in the Japan Patent Office, the entire disclosure of which is hereby incorporated by reference herein.

BACKGROUND

Technical Field

Embodiments of the present disclosure relate to an image forming apparatus.

Related Art

Image forming apparatuses are known to include an image bearer, a transfer member, a biasing unit, a supporting member, a driving source, a rotatable driving member, and a joint member. The supporting member supports the transfer member movably in a direction toward the image bearer and a direction opposite to the direction in which the biasing unit biases the transfer member. The driving source generates a rotational force for rotationally driving the transfer member. The driving member is rotatable and transmits the rotational force from the driving source to the transfer member. The joint member connects the transfer member and the driving member so that an angle with respect to the transfer member and the driving member is changeable and transmits the rotational force from the driving member to the transfer member.

SUMMARY

Embodiments of the present disclosure described herein provide a novel image forming apparatus including an intermediate transfer unit, a secondary transfer unit, and a positioner. The intermediate transfer unit includes an intermediate transferor to bear an image. The secondary transfer unit includes a secondary transfer member to transfer the image borne by the intermediate transferor to a medium. The positioner positions the secondary transfer unit with respect to the intermediate transfer unit. The positioner includes a first member and a second member. The first member is disposed in the intermediate transfer unit. The second member is attachable to and detachable from the secondary transfer unit.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
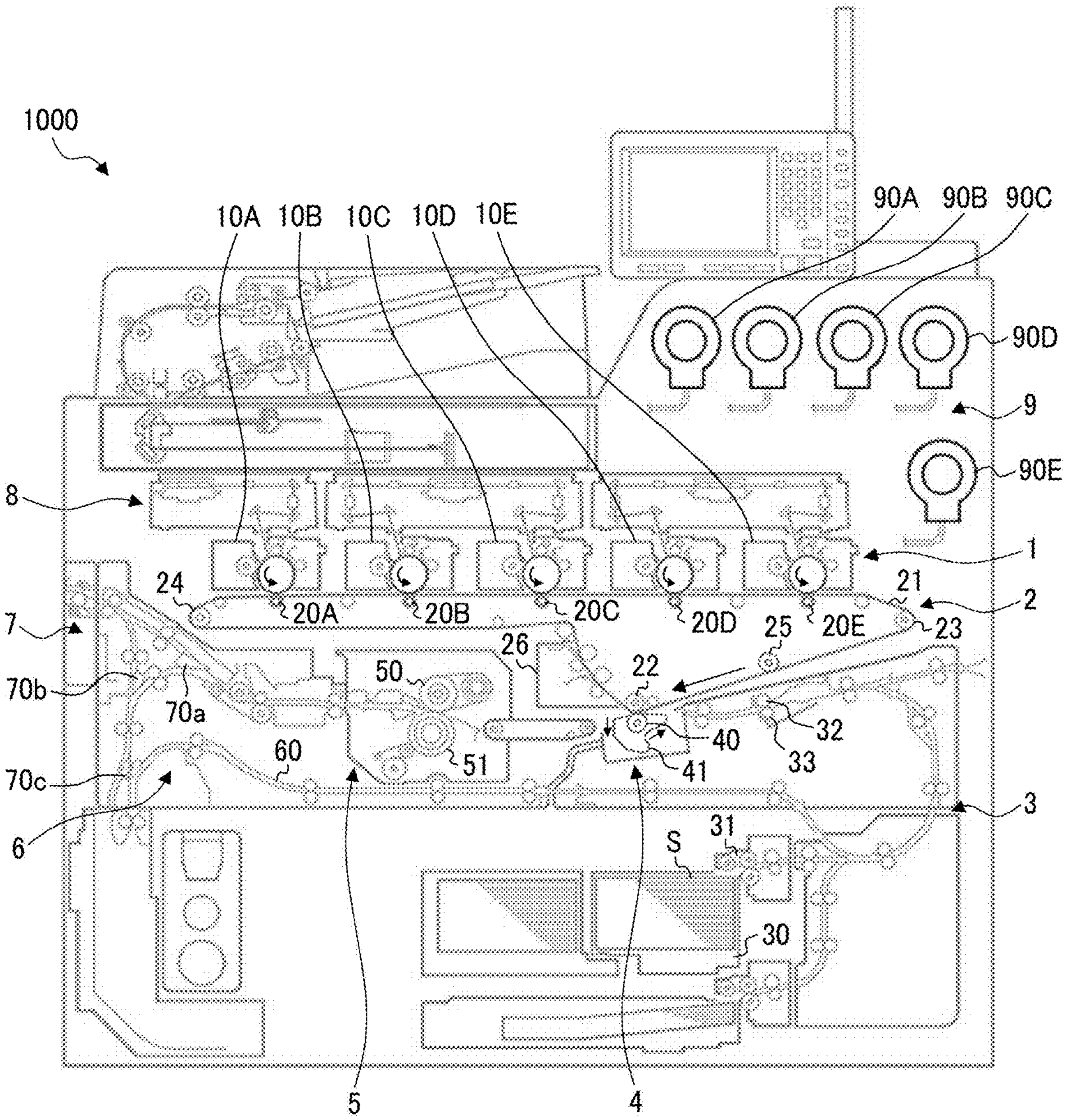
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of an image forming apparatus according to an embodiment of the present disclosure with reference to drawings. In the description of the drawings, the same elements are denoted by the same reference numerals, and redundant descriptions thereof are omitted.

Configuration of Image Forming Apparatus

FIG. 1 is a diagram illustrating an overall configuration of the image forming apparatus according to an embodiment of the present disclosure. The image forming apparatus illustrated in FIG. 1 is a printer that performs image formation by an electrophotographic method.

A printer 1000 includes an image forming device 1, a primary transfer device 2, a sheet supply device 3, a secondary transfer device 4, a fixing device 5, a sheet returning device 6, a sheet ejecting device 7, an exposure device 8, and a toner container mounting device 9.

The image forming device 1 includes a plurality of five image forming units according to the present embodiment, which are image forming units 10A, 10B, 10C, 10D, and 10E. Hereinafter, the plurality of image forming units are collectively referred to as "image forming unit(s) 10". The image forming units 10A to 10E respectively form toner images of different colors. For example, the image forming unit 10B forms a yellow (Y) toner image, the image forming unit 10C forms a magenta (M) toner image, and the image forming unit 10D forms a cyan (C) toner image. The image forming unit 10E forms a black (K) toner image, and the image forming unit 10A forms a toner image of a special color other than Y, M, C, and K.

The special color is not limited to a colored color and may include a colorless color such as a clear toner. The number of image forming units 10 and the arrangement order of colors are not limited to the above description. The number of image forming units may be four or less, or six or more. The order in which the colors of the image forming units are arranged may be appropriately determined in accordance with the specifications of the image forming units and toner characteristics.

Figure 2:
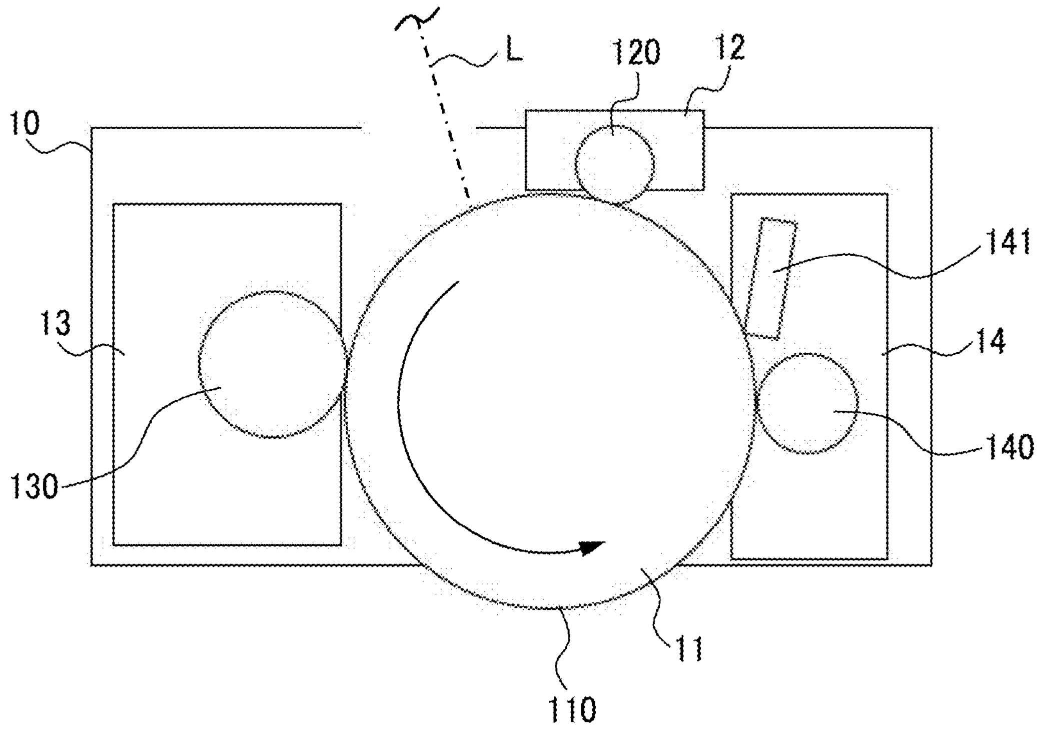
FIG. 2 is a schematic view of an image forming unit according to an embodiment of the present disclosure.

The image forming unit 10 includes a photoconductor module, a charging module, a developing module, and a cleaning module. Each of these modules is described below with reference to FIG. 2. FIG. 2 is a schematic view of the image forming unit according to an embodiment of the present disclosure. Since the image forming units 10A to 10E have substantially the same configuration, in FIG. 2, the image forming unit 10 is illustrated as a representative of the image forming units 10A to 10E.

The image forming unit 10 includes a photoconductor module 11, a charging module 12, a developing module 13, and a cleaning module 14.

The photoconductor module 11 includes, for example, a cylindrical photoconductor 110. The photoconductor 110 is driven to rotate counterclockwise (in a direction indicate by an arrow) in FIG. 2.

The charging module 12 includes, for example, a charging roller 120. The charging roller 120 applies an electric charge to the surface of the photoconductor 110 to charge the surface of the photoconductor 110 to a predetermined potential.

The developing module 13 includes, for example, a developing roller 130 that includes a two-component developer containing a toner and a magnetic carrier. The exposure device 8, which is described later, exposes the surface of the photoconductor 110 charged to the predetermined potential to form an electrostatic latent image. The developing roller 130 applies toner to the electrostatic latent image to form a toner image on the surface of the photoconductor 110.

The cleaning module 14 includes a cleaner such as a cleaning roller 140 and a cleaning blade 141. The cleaning roller 140 and the cleaning blade 141 clean the surface of the photoconductor 110 that has passed through the primary transfer device 2 described later.

Returning to FIG. 1, the overall configuration of the printer 1000 is described.

The primary transfer device 2 is disposed below the image forming device 1. The primary transfer device 2 includes a plurality of primary transfer rollers 20A, 20B, 20C, 20D, and 20E, an intermediate transfer belt 21, a secondary transfer opposing roller 22, a driving roller 23, a driven roller 24, a tension roller 25, and a belt cleaner 26. Hereinafter, the plurality of primary transfer rollers is collectively referred to as "primary transfer roller(s) 20".

The primary transfer roller 20 is disposed at a position facing each photoconductor 110 included in the image forming unit 10. The primary transfer rollers 20 are disposed such that the primary transfer rollers 20 can press the photoconductors 110 via the intermediate transfer belt 21. Each primary transfer roller 20 is pressed toward the photoconductor 110 to form a primary transfer nip between the photoconductor 110 and the intermediate transfer belt 21. A primary transfer bias is applied to the primary transfer roller 20 to form a primary transfer electric field in the primary transfer nip.

The intermediate transfer belt 21 is an endless belt formed in a single layer or multiple layers of polyvinylidene fluoride (PVDF), ethylene-tetrafluoroethylene copolymer (ETFE), polyimide (PI), or polycarbonate (PC). The intermediate transfer belt 21 is stretched over a plurality of support rollers and moves in a clockwise direction in FIG. 1. The intermediate transfer belt 21 is an example of an intermediate transferor.

The secondary transfer opposing roller 22 forms a secondary transfer nip together with a secondary transfer belt 41 included in the secondary transfer device 4 described later.

The driving roller 23 serves as one of the plurality of support rollers that support the intermediate transfer belt 21 and applies power to the intermediate transfer belt 21 that is stretched over the driving roller 23.

The driven roller 24 also serves as one of the plurality of support rollers that support the intermediate transfer belt 21 and rotates together with the movement of the intermediate transfer belt 21.

The tension roller 25 presses a part of the intermediate transfer belt 21 stretched over the plurality of support rollers to apply a predetermined tension to the intermediate transfer belt 21.

The belt cleaner 26 cleans the surface of the intermediate transfer belt 21 that has passed through the secondary transfer belt 41 (secondary transfer nip) described later.

The sheet supply device 3 is disposed in a lower portion of the printer 1000. The sheet supply device 3 includes a sheet feed tray 30, a sheet feeder 31, and a pair of registration rollers 32 and 33. The sheet feed tray 30 loads sheets S as an example of a medium. The sheet feeder 31 feeds the sheets S one by one from the sheet feed tray 30. The pair of registration rollers 32 and 33 convey the sheets S fed from the sheet feeder 31 to the secondary transfer device 4 at a predetermined timing.

The secondary transfer device 4 is disposed below the primary transfer device 2. The secondary transfer device 4 includes a secondary transfer roller 40 and the secondary transfer belt 41 as an example of a secondary transfer member. The secondary transfer roller 40 is disposed at a position facing the secondary transfer opposing roller 22 included in the primary transfer device 2 and is disposed such that the secondary transfer roller 40 presses the secondary transfer opposing roller 22 via the secondary transfer belt 41 and the intermediate transfer belt 21.

The secondary transfer belt 41 is an endless belt, and is stretched over the secondary transfer roller 40 and other guide members to move in the counterclockwise direction in FIG. 1. When the secondary transfer roller 40 presses the secondary transfer belt 41 against the secondary transfer opposing roller 22, a secondary transfer nip is formed between the secondary transfer belt 41 and the intermediate transfer belt 21. A secondary transfer bias is applied to the secondary transfer roller 40 to form a secondary transfer electric field in the secondary transfer nip.

The fixing device 5 is disposed downstream (on the left side in FIG. 1) from the secondary transfer device 4 in a sheet conveyance direction. The fixing device 5 includes a heat roller 50 and a pressure roller 51. The heat roller 50 and the pressure roller 51 can be pressed against each other to form a fixing nip between the heat roller 50 and the pressure roller 51. The sheet S to which a toner image is transferred at the secondary transfer device 4 is heated and pressed at the fixing nip to fix the toner image to the sheet S.

The sheet ejecting device 7 is disposed downstream (on the left side in FIG. 1) from the fixing device 5 in the sheet conveyance direction. The sheet ejecting device 7 includes switchers 70_a_, 70_b_, and 70_c_ that switch the eject destination of the sheet S, and the switchers 70_b_, and 70_c_ convey the sheet S to the outside of the printer 1000 or to the sheet returning device 6 described later.

The sheet returning device 6 is disposed below the sheet ejecting device 7, the fixing device 5, and the secondary transfer device 4. The sheet returning device 6 includes a return path 60 having a plurality of conveyance rollers. The end point of the return path 60 merges with the sheet supply device 3 and conveys the sheet S conveyed from the sheet ejecting device 7 toward the secondary transfer device 4 again.

The exposure device 8 is disposed above the image forming device 1. The exposure device 8 scans the photoconductor 110, which has been charged to the predetermined potential by the charging module 12, with a laser beam L (see FIG. 2) to form an electrostatic latent image on the surface of the photoconductor 110.

The toner container mounting device 9 is disposed above the exposure device 8. The toner container mounting device 9 detachably holds toner containers 90A to 90E containing the toner to be used in the image forming units 10A to 10E respectively. The toner container mounting device 9 and the image forming device 1 are coupled to each other by a toner transfer mechanism, and the toner contained in the toner containers 90A to 90E is respectively transferred to the image forming units 10A to 10E by the toner transfer mechanism. When each of the toner containers 90A to 90E is desired to be replaced, the toner container is removed from the toner container mounting device 9 and replaced with a new toner container.

When the printer 1000 receives image data transmitted from an external device such as a personal computer, the printer 1000 starts a print job and starts driving the intermediate transfer belt 21. In the image forming device 1, the charging roller 120 uniformly charges the surface of the rotating photoconductor 110 to a predetermined charging potential.

An electrostatic latent image for each color is formed on the charged surface of the photoconductor 110 by optical scanning using a laser beam L emitted by the exposure device 8 based on image data. The developing modules 13 of the image forming units 10A to 10E develop electrostatic latent images into toner images on the surfaces of the photoconductors 110. The toner images on the surfaces of the photoconductors 110 are sequentially transferred onto the intermediate transfer belt 21 such that the toner images of different colors are superimposed one atop another on the surface of the intermediate transfer belt 21 in a primary transfer process. As a result, a composite-color toner image is formed on the intermediate transfer belt 21. After the toner image is transferred to the intermediate transfer belt 21, the cleaning module 14 cleans the photoconductor 110 to remove the toner remaining on the surface of the photoconductor 110 from the surface of the photoconductor 110.

The sheet S fed from the sheet feeder 31 of the sheet supply device 3 is conveyed until the sheet S reaches the pair of registration rollers 32 and 33. When the sheet S reaches the pair of registration rollers 32 and 33, the conveyance of the sheet S is temporarily stopped. The pair of registration rollers 32 and 33 starts conveying the sheet S again in synchronization with the arrival of the toner image on the intermediate transfer belt 21 at the secondary transfer nip. The sheet S that is conveyed again by the pair of registration rollers 32 and 33 meets the toner image on the intermediate transfer belt 21 in the secondary transfer nip. Thus, in synchronization with the arrival of the toner image on the intermediate transfer belt 21, the toner image is transferred from the intermediate transfer belt 21 onto the sheet S in the secondary transfer nip.

After the toner image has been transferred onto the sheet S in the secondary transfer nip, the sheet S is conveyed to the fixing device 5 where the toner image on the sheet S is fixed to the sheet S by application of heat and pressure. Then, the sheet S is conveyed to the sheet ejecting device 7, and further conveyed to the outside of the printer 1000 or to the sheet returning device 6 according to the guide of the switchers 70*a*, 70*b*, and 70*c*. The sheet returning device 6 reverses the sheet S upside down (turn the front and back sides of the sheet S) to convey the sheet S again to the secondary transfer nip. The sheet S is ejected from the sheet ejecting device 7 after the toner image is secondarily transferred to the back side of the sheet S at the secondary transfer nip.

After the intermediate transfer belt 21 passes through the secondary transfer nip, the belt cleaner 26 cleans the intermediate transfer belt 21 to remove toner remaining on the surface of the intermediate transfer belt 21 from the surface of the intermediate transfer belt 21.

Configuration of Secondary Transfer Unit

Figure 3:
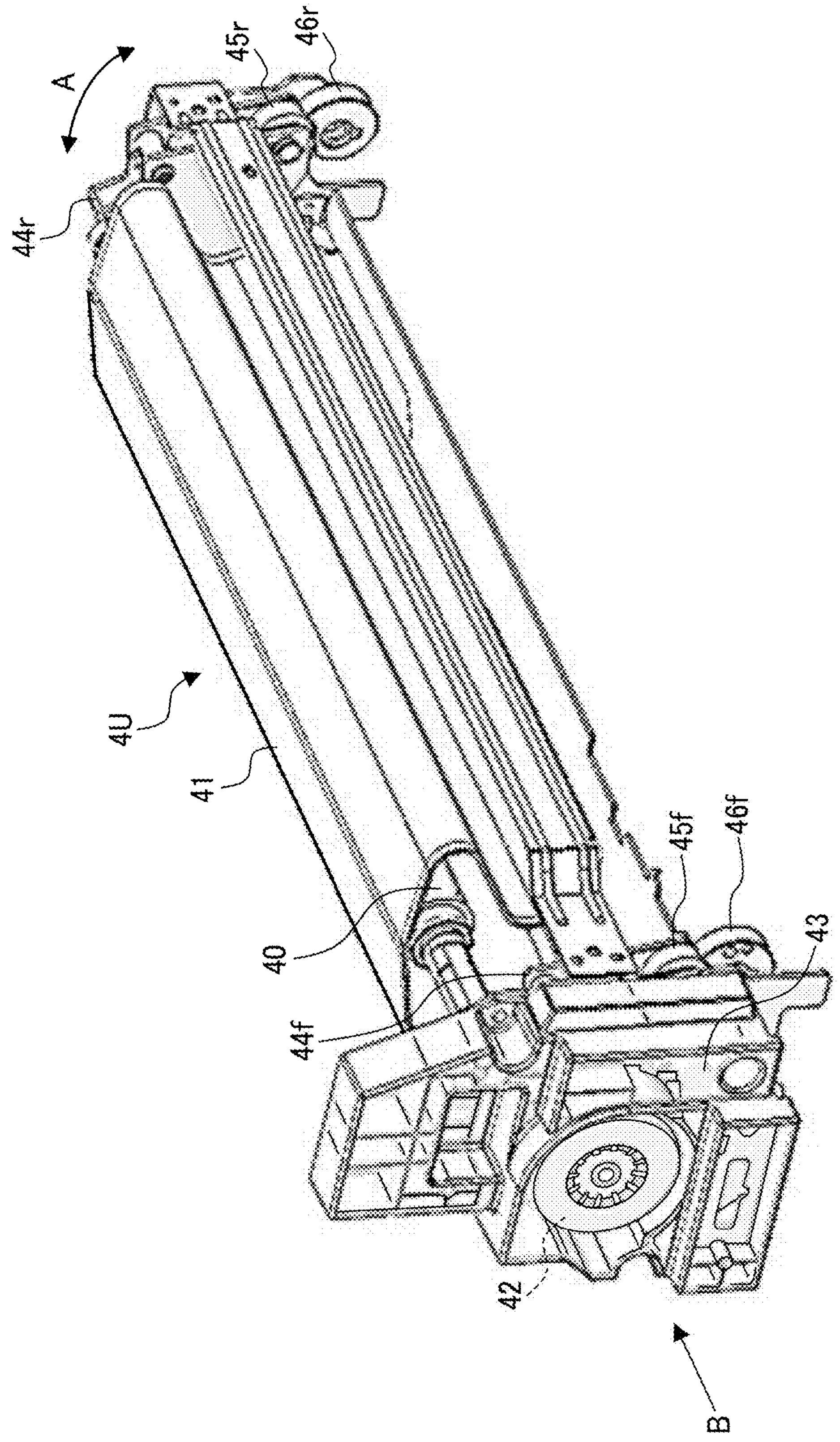
FIG. 3 is a perspective view of a secondary transfer unit according to an embodiment of the present disclosure.
Figure 4:
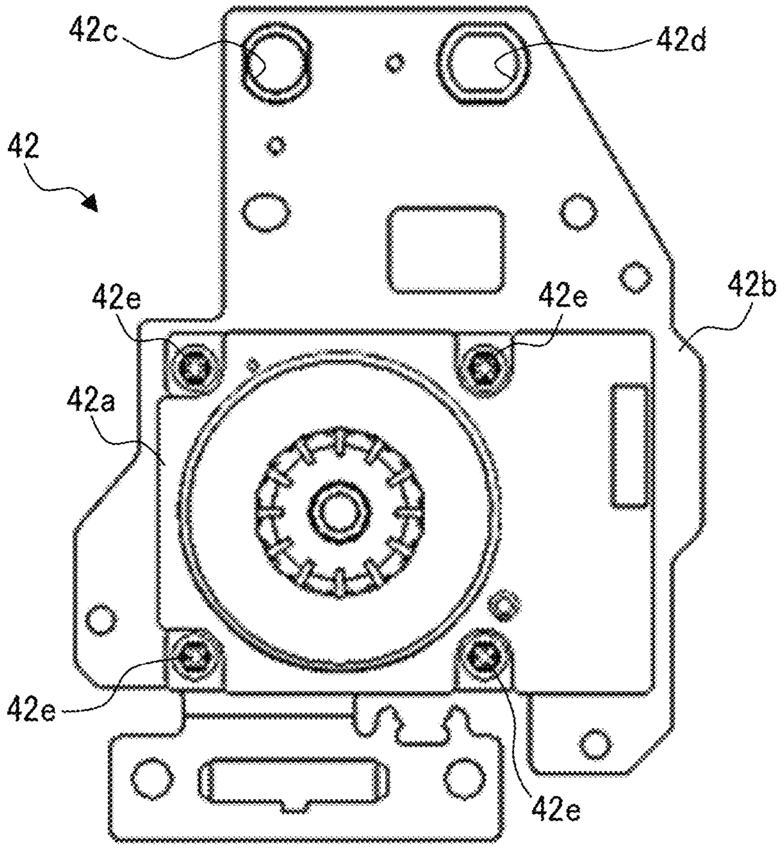
FIG. 4 is a diagram illustrating a driver viewed from the direction indicated by arrow B in FIG. 3.
Figure 5B:
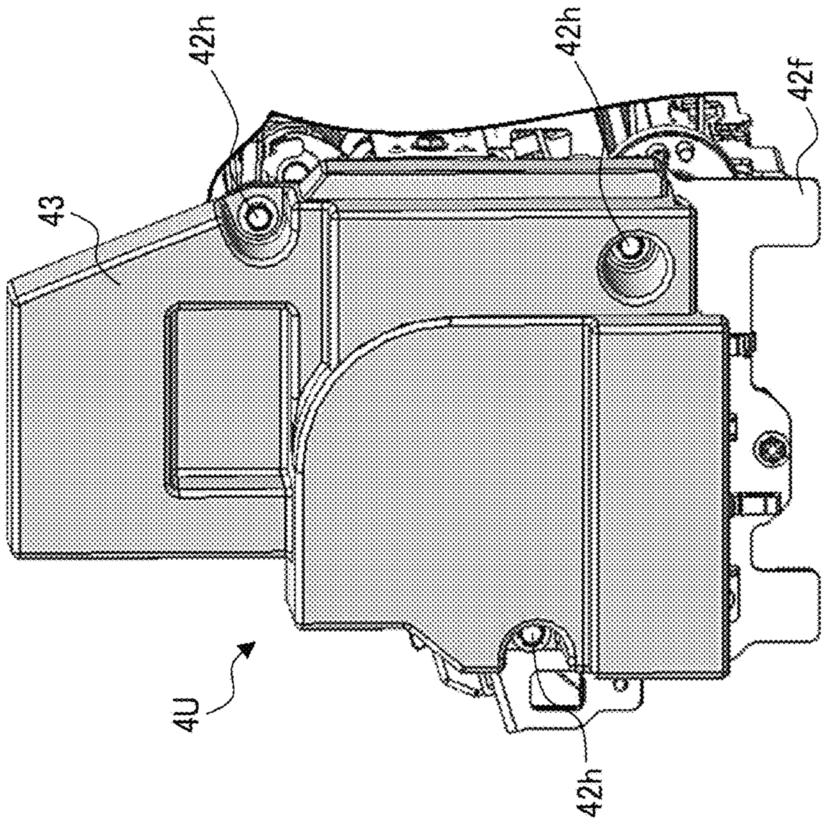
FIGS. 5A and 5B are diagrams illustrating attachment of a positioning face plate of the secondary transfer unit.

Next, a description is given of the configuration of a secondary transfer unit with reference to FIGS. 3 to 5B, according to an embodiment of the present disclosure. FIG. 3 is a perspective view of the secondary transfer unit. FIG. 4 is a diagram illustrating a driver viewed from the direction indicated by arrow B in FIG. 3. FIGS. 5A and 5B are diagrams illustrating attachment of a positioning face plate of the secondary transfer unit.

A secondary transfer unit 4U includes a driver 42, an exterior cover 43, arms 44, cam followers 45, and cams 46 in addition to the secondary transfer roller 40 and the secondary transfer belt 41 in the secondary transfer device 4 illustrated in FIG. 1.

The driver 42 includes a driving motor 42*a* that drives the secondary transfer belt 41 and the secondary transfer roller 40. Note that the driver 42 may include a gear mechanism as appropriate. The exterior cover 43, which is an example of a cover, is formed such that the exterior cover 43 covers the driver 42 to protect the driver 42. The driver 42 is integrated with the exterior cover 43. When the driving motor 42*a* is maintained, the driver 42 is removable from the secondary transfer unit 4U together with the exterior cover 43.

The arms 44, the cam followers 45, and the cams 46 are disposed on each of a front side (denoted by reference code f) and a rear side (denoted by reference code r) of the printer 1000 and constitute at least part of a contact-and-separation mechanism serving as an adjuster that causes the secondary transfer roller 40 and the secondary transfer belt 41 to contact with and separate from the intermediate transfer belt 21.

In the present embodiment, arms 44*f* and 44*r* are disposed at both ends of each of the secondary transfer roller 40 and the secondary transfer belt 41 and support the secondary transfer roller 40 and the secondary transfer belt 41 such that the secondary transfer roller 40 and the secondary transfer belt 41 can drive. The arms 44*f* and 44*r* are provided with cam followers 45*f* and 45*r* at positions facing cams 46*f* and 46*r*, and the cam followers 45*f* and 45*r* come into contact with the cam surfaces of the cams 46*f* and 46*r*.

In the above-described configuration, when the cams 46*f* and 46*r* are rotated, the secondary transfer roller 40 and the secondary transfer belt 41 are moved in the direction indicated by arrow A in FIG. 3 via the cam followers 45*f* and 45*r* and the arms 44*f* and 44*r*. Thus, the contact and separation operations of the secondary transfer roller 40 and the secondary transfer belt 41 are performed with respect to the intermediate transfer belt 21.

The exterior cover 43 illustrated in FIG. 3 is attachable to and detachable from the driver 42. FIG. 4 illustrates the driver 42 in a state in which the exterior cover 43 is removed. The driver 42 includes the driving motor 42*a*, a positioning face plate 42*b*, and positioning holes 42*c* and 42*d*.

The driving motor 42*a* is fixed to the positioning face plate 42*b* by screws 42*e*. When the screws 42*e* is removed, the driving motor 42*a* can be removed from the positioning face plate 42*b*.

The positioning face plate 42*b* includes the positioning holes 42*c* and 42*d* and has a positioning function with respect to an intermediate transfer unit 2U described later. The positioning holes 42*c* and 42*d* are engaged with positioning pins disposed on the intermediate transfer unit 2U described later to position the secondary transfer unit 4U with respect to the intermediate transfer unit 2U.

Figure 5A:
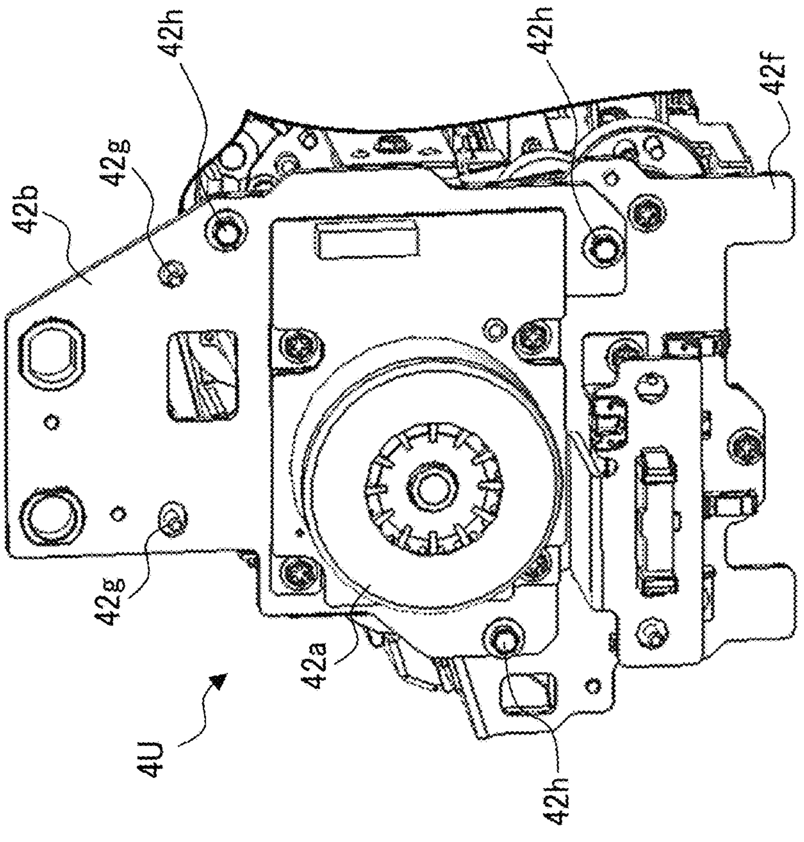

As illustrated in FIG. 5A, the positioning face plate 42*b* is positioned with respect to a front plate 42*f* of the secondary transfer unit 4U by using embosses 42*g* disposed at two positions on the positioning face plate 42*b*. Then positioning face plate 42*b* is fixed by screws 42*h* (at three positions in the present embodiment). Since the exterior cover 43 is attached to the driving motor 42*a*, such that the exterior cover 43 and the driving motor 42*a* are combined into a single unit (i.e., integrated) as described above, the screws 42*h* fix the exterior cover 43 and the positioning face plate 42*b* to the front plate 42*f* of the secondary transfer unit 4U as illustrated in FIG. 5B.

Configuration of Positioning

Figure 6:
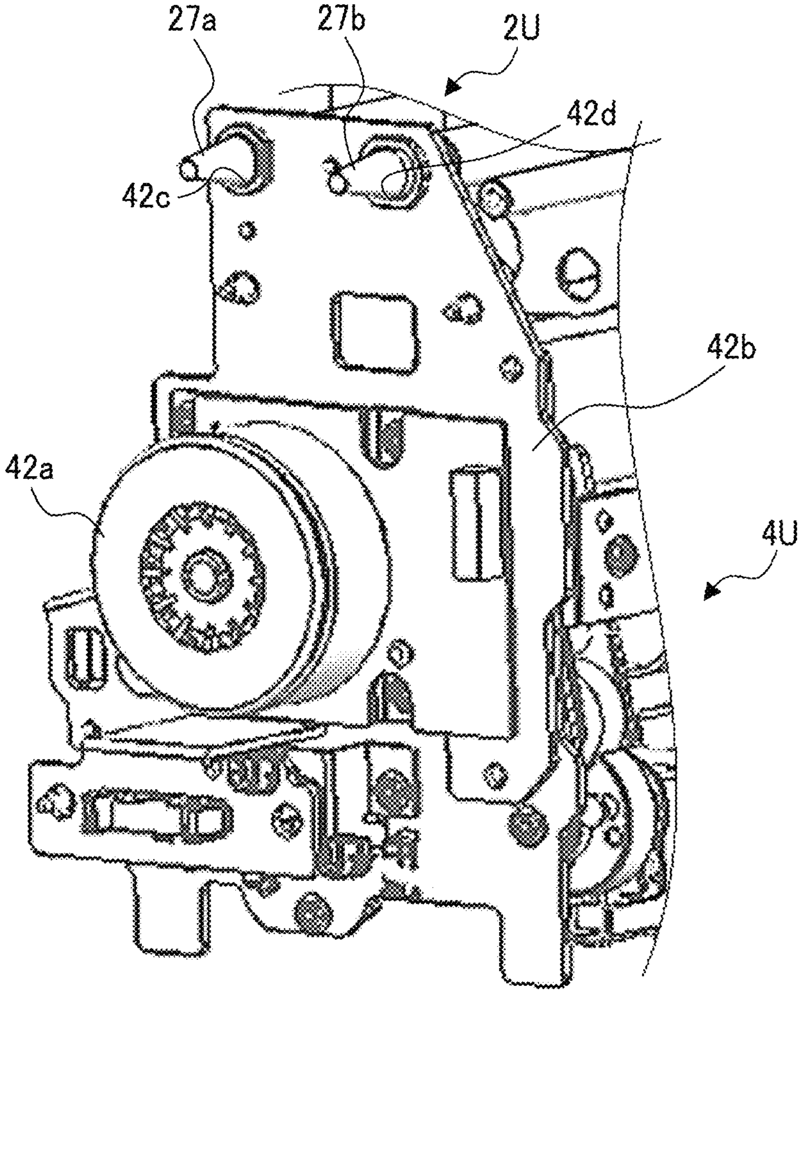
FIG. 6 is a diagram illustrating the secondary transfer unit attached to an intermediate transfer unit.
Figure 7A:
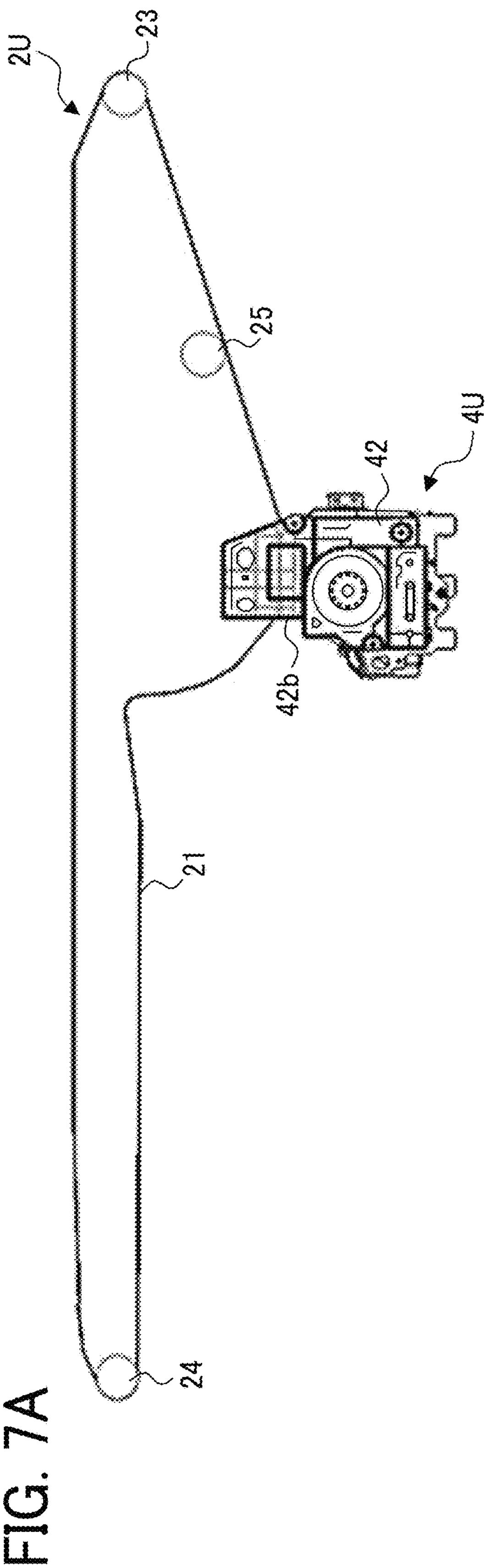
FIGS. 7A and 7B are diagrams illustrating a relation between the intermediate transfer unit and a driver.
Figure 7B:
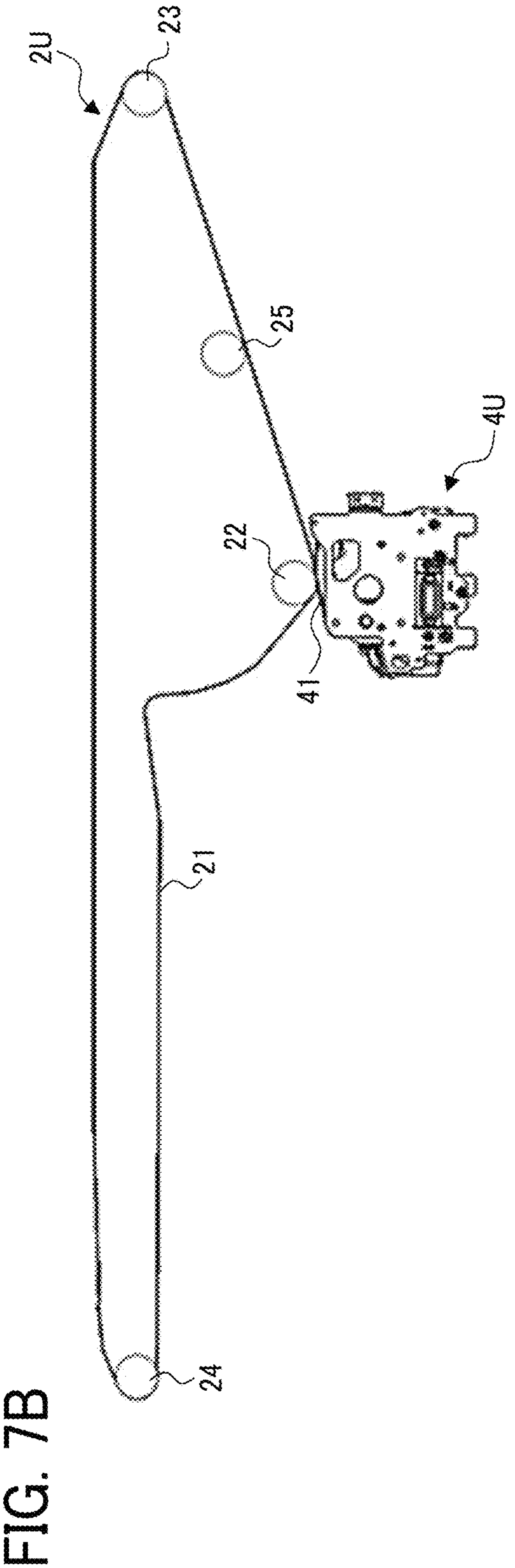

Next, a description is given of a configuration of positioning of the intermediate transfer unit 2U and the secondary transfer unit 4U with reference to FIGS. 6, 7A, and 7B. FIG. 6 is a diagram illustrating a state in which the secondary transfer unit 4U is attached to the intermediate transfer unit 2U. FIGS. 7A and 7B are diagrams illustrating a relation between the intermediate transfer unit 2U and the driver 42. Note that the exterior cover 43 is not illustrated in FIG. 6 in order to explain the configuration of the positioner.

In FIG. 6, the intermediate transfer unit 2U includes positioning pins 27*a* and 27*b* as an example of a first member constituting part of a positioner. The positioning pins 27*a* and 27*b* are fitted into the positioning holes 42*c* and 42*d* provided in the positioning face plate 42*b* of the secondary transfer unit 4U such that the secondary transfer unit 4U is positioned with respect to the intermediate transfer unit 2U. The positioning face plate 42*b* is an example of a second member constituting part of the positioner.

In the present embodiment, the intermediate transfer unit 2U includes the positioning pins. However, the intermediate transfer unit 2U may include the positioning holes and the positioning face plate 42*b* may include the positioning pins.

As described above, in the present embodiment, the printer 1000 includes the intermediate transfer unit 2U, the secondary transfer unit 4U, and a positioner. The intermediate transfer unit 2U includes the intermediate transfer belt 21 that can bear an image. The secondary transfer unit 4U includes the secondary transfer roller 40 and the secondary transfer belt 41. The secondary transfer roller 40 transfers the image borne on the intermediate transfer belt 21 to the sheet S. The positioner that positions the secondary transfer unit 4U with respect to the intermediate transfer unit 2U includes the positioning pins 27*a* and 27*b* included in the intermediate transfer unit 2U and the positioning face plate 42*b* attached to the secondary transfer unit 4U. The positioning face plate 42*b* is attachable to and detachable from the secondary transfer unit 4U.

As described above, the secondary transfer unit 4U includes the contact-and-separation mechanism (including the arm 44, the cam follower 45, and the cam 46) serving as an adjuster that causes the secondary transfer roller 40 and the secondary transfer belt 41 to contact with and separate from the intermediate transfer belt 21.

As a result, the intermediate transfer unit 2U and the secondary transfer unit 4U can be accessed from one side (front side in the present embodiment) of the printer 1000, and thus the maintainability can be enhanced.

As described above, the positioning pins 27*a* and 27*b* are engaged with the positioning holes 42*c* and 42*d* respectively such that the secondary transfer unit 4U is positioned with respect to the intermediate transfer unit 2U. As a result, the intermediate transfer unit 2U and the secondary transfer unit 4U can be easily positioned.

As described above, the secondary transfer unit 4U includes the driver 42 that drives the secondary transfer roller 40 and the secondary transfer belt 41, and the driver 42 is integrated with the positioning face plate 42*b*. As a result, the driver 42 can be removed together with the positioning face plate 42*b*, and thus the maintainability of the driver 42 can be enhanced.

As described above, the driver 42 is integrated with the exterior cover 43 that covers the driver 42. As a result, when components of the intermediate transfer unit 2U are replaced, the load of operation of removing the exterior cover 43 can be obviated, and thus maintainability of the intermediate transfer unit 2U is enhanced.

FIG. 7A illustrates a state in which the driver 42 is attached to the secondary transfer unit 4U, and FIG. 7B illustrates a state in which the driver 42 is detached from the secondary transfer unit 4U.

In the state illustrated in FIG. 7A, since the driver 42 (positioning face plate 42*b*) of the secondary transfer unit 4U is positioned on the front side of the intermediate transfer unit 2U, the intermediate transfer unit 2U cannot be pulled out alone to the front side of the printer 1000.

On the other hand, in the state illustrated in FIG. 7B, since there is no interfering member on the front side of the intermediate transfer unit 2U, the intermediate transfer unit 2U can be pulled out alone from the printer 1000.

When the intermediate transfer unit 2U is inserted into or removed from the printer 1000, it is desirable to have a gap between the intermediate transfer unit 2U and the secondary transfer unit 4U to prevent members from being damaged by unexpected contact. In the present embodiment, an extra space is provided below the secondary transfer unit 4U. When the positioning holes 42*c* and 42*d* of the driver 42 are removed from the positioning pins 27*a* and 27*b* of the intermediate transfer unit 2U, the secondary transfer unit 4U is positioned in the extra space. Since a sufficient gap between the intermediate transfer unit 2U and the secondary transfer unit 4U is provided as described above, for example, maintainability is enhanced in a case where a service person replaces a component such as the intermediate transfer belt 21.

As described above, in the present embodiment, at least the intermediate transfer unit 2U of the intermediate transfer unit 2U and the secondary transfer unit 4U is supported such that at least the intermediate transfer unit 2U is drawable with respect to the printer 1000. When the positioning face plate 42*b* is removed from the secondary transfer unit 4U, the intermediate transfer unit 2U can be drawn alone from the printer 1000. Accordingly, the maintainability of the intermediate transfer unit 2U can be further enhanced.

MODIFICATIONS

Hereinafter, a description is given of modifications of the image forming apparatus according to the present embodiment.

A printer in which image formation is performed based on an electrophotographic method is described in the embodiments above. However, the image forming method is not limited to the electrophotographic method, and the image forming apparatus may be a printer that forms an image by an inkjet method. Examples of the inkjet method include a method (transfer method) in which ink is applied to a medium through a transfer process. A description is given of examples of the transfer method with reference to FIGS. 8A and 8B.

Figure 8B:
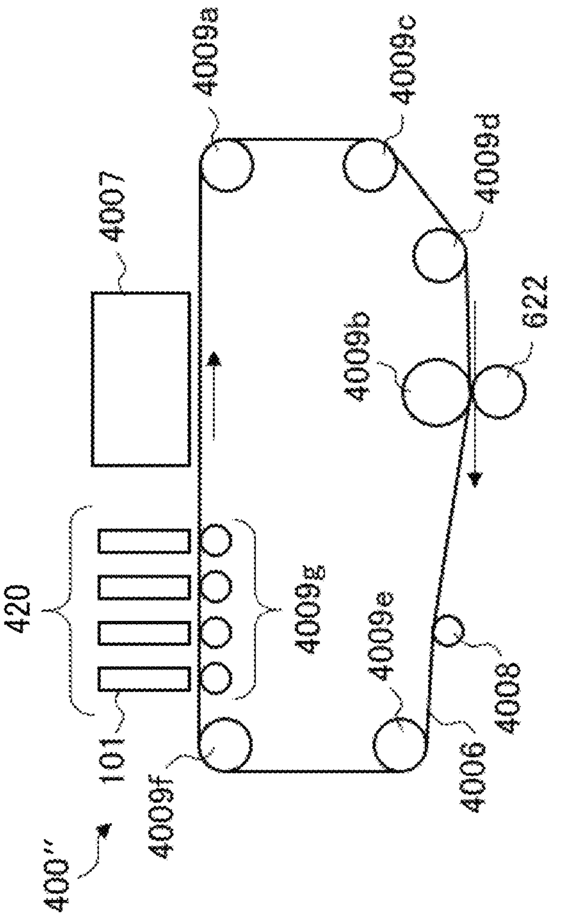
FIGS. 8A and 8B are diagrams illustrating modifications of an image forming device.
Figure 8A:
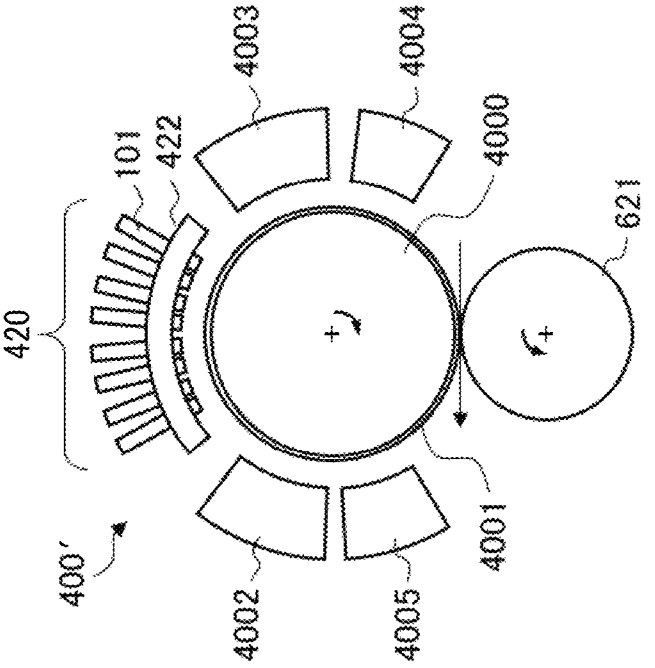

FIGS. 8A and 8B are diagrams illustrating modifications of the image forming device. FIG. 8A illustrates an image forming device of an inkjet printer using a drum-shaped intermediate transferor, and FIG. 8B illustrates an image forming device of an inkjet printer using an endless-belt-shaped intermediate transferor.

An image forming unit 400' illustrated in FIG. 8A transfers a liquid composition such as ink to a medium via an intermediate transferor 4001 to form an image on a surface of the medium such as a sheet.

The image forming unit 400' includes an inkjet unit 420, a transfer drum 4000, a pre-processing unit 4002, an absorption unit 4003, a heating unit 4004, and a cleaning unit 4005.

The inkjet unit 420 includes a head module 422 that includes a plurality of heads 101. The head 101 discharges ink onto the intermediate transferor 4001 supported by the transfer drum 4000 to form an image on the intermediate transferor 4001. Each head 101 is a line head, and nozzles are arranged in a range that covers the width of a recording region of a medium having a maximum usable size.

The head 101 has a nozzle surface on the lower surface of the head 101, on which nozzles are formed, and the nozzle surface faces the surface of the intermediate transferor 4001 via a minute gap. In the present embodiment, since the intermediate transferor 4001 is configured to circularly move on a circular orbit, the plurality of heads 101 are radially arranged.

The transfer drum 4000 faces a pressure drum 621 to form a transfer nip. The pre-processing unit 4002 applies, for example, reaction liquid for increasing the viscosity of ink onto the intermediate transferor 4001 before the head 101 discharges the ink. The absorption unit 4003 absorbs a liquid component from the image borne by the intermediate transferor 4001 before the transfer of the image on the intermediate transferor 4001 to the medium.

The heating unit 4004 heats the image borne by the intermediate transferor 4001 before the transfer. The resin in the image is melted by heating the image, and the transferability to the medium is enhanced. The cleaning unit 4005 cleans the surface of the intermediate transferor 4001 after the transfer to remove exogenous materials such as ink and dust remaining on the surface of intermediate transferor 4001.

The outer circumferential surface of the pressure drum 621 is in pressure contact with the intermediate transferor 4001. When the medium passes through the transfer nip between the pressure drum 621 and the intermediate transferor 4001, the image on the intermediate transferor 4001 is transferred to the medium. The pressure drum 621 may include at least one grip mechanism that holds the leading end of the medium on the outer circumferential surface of the pressure drum 621.

According to the modification illustrated in FIG. 8A, the positioning of the unit having the intermediate transferor 4001 and the unit having the pressure drum 621 is performed in the inkjet printer having the above-described configuration, thus allowing the maintainability of the intermediate transferor 4001 and the pressure drum 621 to be enhanced.

An image forming unit 400" illustrated in FIG. 8B transfers a liquid composition such as ink to a medium via an intermediate transfer belt 4006 to form an image on a surface of the medium such as a sheet.

The image forming unit 400" discharges ink droplets from a plurality of heads 101 provided in the inkjet unit 420 to form an image on the outer circumferential surface of the intermediate transfer belt 4006. The image formed on the intermediate transfer belt 4006 is dried by the drying unit 4007, and the image is formed as a thin film on the intermediate transfer belt 4006.

Then, the image formed into a thin film on the intermediate transfer belt 4006 is transferred onto a medium in a transfer nip in which the intermediate transfer belt 4006 faces a transfer roller 622. A cleaning roller 4008 cleans the surface of the intermediate transfer belt 4006 after the transfer of the image.

The intermediate transfer belt 4006 is wound around a driving roller 4009*a*, an opposing roller 4009*b*, a plurality of (four in this example) shaping rollers 4009*c*, 4009*d*, 4009*e*, 4009*f*, and a plurality of (four in this example) support rollers 4009*g* and moves in the direction indicated by arrow in the FIG. 8B. The support rollers 4009*g* facing the heads 101 maintain a tensile state of the intermediate transfer belt 4006 when ink droplets are discharged from the heads 101.

According to the modification illustrated in FIG. 8B, the positioning of the unit having the intermediate transfer belt 4006 and the unit having the transfer roller 622 is performed in the inkjet printer having the above-described configuration, thus allowing the maintainability of the intermediate transfer belt 4006 and the transfer roller 622 to be enhanced.

Note that the above descriptions are of some examples, and the present disclosure is not limited to the above-described embodiments. Embodiments of the present disclosure can be changed within the range that can be conceived of by those skilled in the art, such as other embodiments, additions, modifications, deletions, and the scope of the present disclosure encompasses any following aspect that achieves the operation and advantageous effect of the present disclosure.

Aspect 1

An image forming apparatus (e.g., the printer 1000) includes an intermediate transfer unit, a secondary transfer unit, and a positioner. The intermediate transfer unit includes an intermediate transferor (e.g., the intermediate transfer belt 21) to bear an image. The secondary transfer unit includes a secondary transfer member (e.g., the secondary transfer roller 40 and the secondary transfer belt 41) to transfer the image borne by the intermediate transferor to a medium (e.g., the sheet S). The positioner positions the secondary transfer unit with respect to the intermediate transfer unit. The positioner includes a first member (e.g., the positioning pin 27*a* and the positioning pin 27*b*) disposed in the intermediate transfer unit and a second member (e.g., the positioning face plate 42*b*) attached to the secondary transfer unit. The second member is attachable to and detachable from the secondary transfer unit.

Aspect 2

In the image forming apparatus described in Aspect 1, the secondary transfer unit includes a contact-and-separation mechanism (e.g., the arm 44, the cam follower 45, and the cam 46) that causes the secondary transfer member (e.g., the secondary transfer roller 40 and the secondary transfer belt 41) to contact with and separate from the intermediate transferor (e.g., the intermediate transfer belt 21).

Aspect 3

In the image forming apparatus described in Aspect 1 or Aspect 2, one of the first member and the second member is a positioning pin (e.g., the positioning pin 27*a* and the positioning pin 27*b*) and the other of the first member and the second member has a positioning hole (e.g., the positioning hole 42*c* and the positioning hole 42*d*). The positioning pin engages with the positioning hole to position the secondary transfer unit with respect to the intermediate transfer unit.

Aspect 4

In the image forming apparatus described in any one of Aspects 1 to 3, the secondary transfer unit includes a driver (e.g., the driver 42) to drive the secondary transfer member (e.g., the secondary transfer roller 40 and the secondary transfer belt 41). The driver is integrated with the second member (e.g., the positioning face plate 42*b*).

Aspect 5

In the image forming apparatus described in Aspect 4, the driver (e.g., the driver 42) is integrated with a cover (e.g., the exterior cover 43) that covers the driver.

Aspect 6

In the image forming apparatus described in any one of Aspects 1 to 5, at least the intermediate transfer unit, of the intermediate transfer unit and the secondary transfer unit, is supported to be drawable from the image forming apparatus (e.g., the printer 1000). Removal of the second member (e.g., the positioning face plate 42*b*) from the secondary transfer unit allows the intermediate transfer unit to be drawn alone from the image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

an intermediate transfer unit including an intermediate transferor to bear an image;

a secondary transfer unit including a secondary transfer member and a driving motor that drives the secondary transfer member, the secondary transfer member configured to transfer the image borne by the intermediate transferor to a medium; and a positioner configured to position the secondary transfer unit with respect to the intermediate transfer unit, the positioner including:

a first member disposed in the intermediate transfer unit; and a second member attachable to and detachable from the secondary transfer unit, wherein the driving motor is integrated with the second member, and in a state where the second member is detached from the secondary transfer unit, the driving motor is detached from the secondary transfer unit together with the second member.

2. The image forming apparatus according to claim 1, wherein the secondary transfer unit includes an adjuster that causes the secondary transfer member to contact or separate from the intermediate transferor.

3. The image forming apparatus according to claim 1, wherein one of the first member and the second member includes a positioning pin and another one of the first member and the second member includes a positioning hole, and wherein the positioning pin engages with the positioning hole to position the secondary transfer unit with respect to the intermediate transfer unit.

4. The image forming apparatus according to claim 1, wherein the driving motor is integrated with a cover that covers the driving motor.

5. The image forming apparatus according to claim 1, wherein at least the intermediate transfer unit is supported to be drawable from the image forming apparatus, and wherein the intermediate transfer unit is drawable alone from the image forming apparatus in a state where the second member is detached from the secondary transfer unit.

6. An image forming apparatus comprising:

an intermediate transfer unit including an intermediate transferor to bear an image;

a secondary transfer unit including a secondary transfer member and a driving motor that drives the secondary transfer member, the secondary transfer member configured to transfer the image borne by the intermediate transferor to a medium; and a positioner configured to position the secondary transfer unit with respect to the intermediate transfer unit, the positioner including:

a positioning pin disposed in the intermediate transfer unit; and a positioning plate attachable to and detachable from the secondary transfer unit, wherein the driving motor is integrated with the positioning plate, and in a state where the positioning plate is detached from the secondary transfer unit, the driving motor is detached from the secondary transfer unit together with the positioning plate.

* * * * *